United States Patent
Acker et al.

(10) Patent No.: US 6,540,253 B2
(45) Date of Patent: Apr. 1, 2003

(54) ASSEMBLY INCLUDING A GAS BAG

(75) Inventors: Dominique Acker, Alfdorf (DE); Jürgen Heigl, Böbingen (DE); Alexander Heilig, Wissgoldingen (DE); Sven Hofmann, Schwäbisch Gmünd (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/833,851

(22) Filed: Apr. 12, 2001

(65) Prior Publication Data

US 2001/0030415 A1 Oct. 18, 2001

(30) Foreign Application Priority Data

Apr. 14, 2000 (DE) .................................... 200 06 927 U

(51) Int. Cl.$^7$ ................................................ B60R 21/22
(52) U.S. Cl. .................................................... 280/730.2
(58) Field of Search ........................ 280/730.2, 730.1, 280/728.2, 728.1

(56) References Cited

U.S. PATENT DOCUMENTS

| | | | |
|---|---|---|---|
| 4,130,298 A | * 12/1978 | Shaunnessey | ............... 280/729 |
| 5,197,759 A | 3/1993 | Kroiss et al. | |
| 5,439,247 A | 8/1995 | Kolb | |
| 5,722,685 A | * 3/1998 | Eyrainer | ..................... 280/729 |
| 5,938,233 A | * 8/1999 | Specht | ................... 280/730.2 |
| 5,984,348 A | * 11/1999 | Specht et al. | ............ 280/730.1 |
| 6,135,493 A | * 10/2000 | Jost et al. | ................. 280/730.2 |
| 6,152,481 A | * 11/2000 | Webber et al. | ........... 280/728.2 |

FOREIGN PATENT DOCUMENTS

| | | |
|---|---|---|
| DE | 4028715 | 10/1991 |
| DE | 4232658 | 3/1994 |
| DE | 19824601 | 12/1999 |

\* cited by examiner

*Primary Examiner*—Paul N. Dickson
*Assistant Examiner*—Faye M. Fleming
(74) *Attorney, Agent, or Firm*—Tarolli, Sundheim, Covell & Tummino L.L.P.

(57) ABSTRACT

An assembly consists of a vehicle door, an A-pillar of a vehicle and an inflatable gas bag. In the inflated condition, the gas bag is supported by the vehicle door and in the region of the A-pillar of the vehicle. The internal overpressure exceeds $10^5$ Pa (14.5 psi) in at least one part of the inflated gas bag.

6 Claims, 1 Drawing Sheet

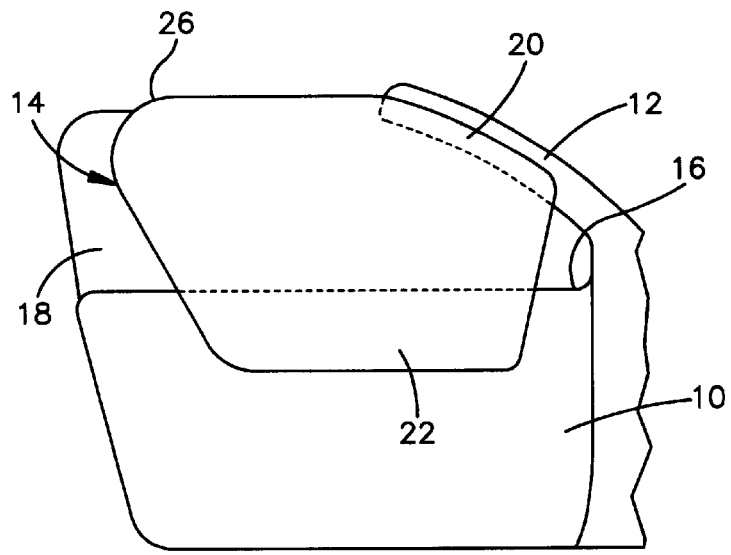 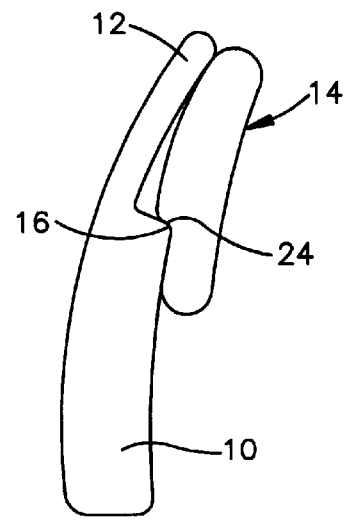
Fig.1a  Fig.1b
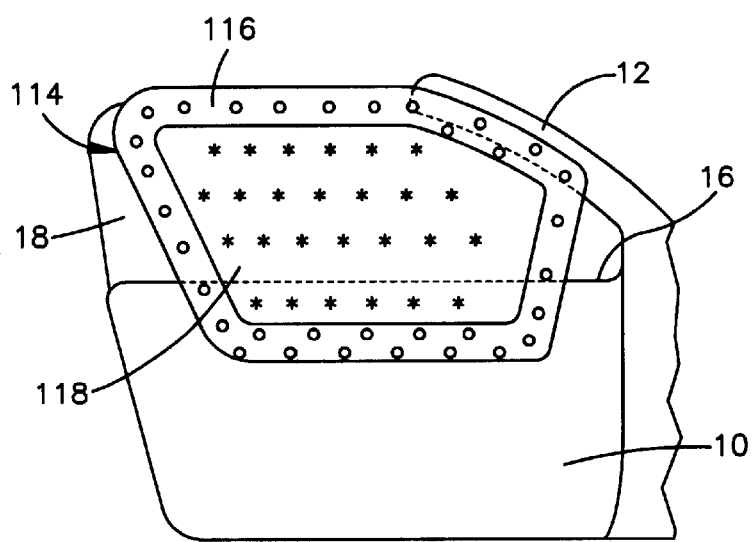 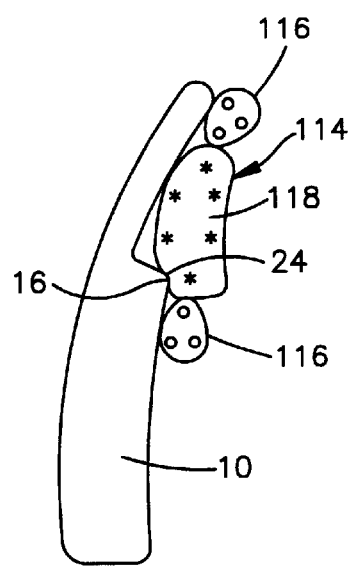
Fig.2a  Fig.2b

ASSEMBLY INCLUDING A GAS BAG

FIELD OF THE INVENTION

The invention relates to an assembly consisting of a vehicle door, an A-pillar of a vehicle and an inflatable gas bag.

BACKGROUND OF THE INVENTION

Gas bags have a proven record of success in restraint systems to protect the vehicle occupant from injuries due to, for example, the vehicle being involved in a head-on collision. To offer protection also in the case of a side-impact collision or toppling of the vehicle, side gas bags are employed. Such gas bags are known which prior to deployment are accommodated in the roof structure or A-pillar of the vehicle and are stabilized via arresting devices to the vehicle parts. Likewise known are gas bags which prior to deployment are accommodated in the vehicle door and may be supported deployed by the B-pillar of the vehicle and/or windowsill.

When the vehicle is involved in an accident it is very often the case that the side windows of the vehicle are shattered and thus no longer afford any supporting effect so that a side gas bag needs to not only deplete the movement energy of the vehicle occupant in avoiding injury but also to prevent the vehicle occupant, his head or hands from being catapulted outwards from the vehicle.

On vehicles having no roof contour, especially convertibles, this protection is most important. At the same time, however, difficulties materialize in providing the gas bag with adequate stability, due to the lack of the vehicle roof structure, since it is obvious that conventional gas bags deploying from the door and supported by the B-pillar, roof or window frame cannot be made use of in this case.

BRIEF SUMMARY OF THE INVENTION

The object of the invention is to provide a gas bag for vehicles having no roof contour which is capable of preventing the vehicle occupant from being catapulted outwards. For this purpose in an assembly consisting of a vehicle door, an A-pillar of a vehicle and an inflatable gas bag the gas bag in an inflated condition is supported by the vehicle door and in a region of the A-pillar of the vehicle. The internal overpressure exceeds $10^5$ Pa (14.5 psi) in at least one part of the inflated gas bag. The gas bag gains the necessary stability from the support in the region of the A-pillar and preferably at the windowsill, i.e. by the gas bag being supported either by the A-pillar itself or by the section of the door frame located in the vicinity of the A-pillar. This stabilizes the gas bag in the region between windowsill and A-pillar. The high internal overpressure in the gas bag ensures that also the exposed, i.e. non-supported portion of the gas bag does not give way outwards in cushioning a vehicle occupant or part of his body.

Advantageously, the gas bag is fabricated so as to be gas-tight, i.e. the material of the gas bag itself being gas-tight and the gas bag having no gas-exit ports. Since the compressed gas is unable to escape from the gas bag, the gas bag maintains its shape and the high internal overpressure over a considerable period of time, preferably longer than 5 seconds. This thus maintains the protection for the vehicle occupant even when the vehicle topples.

In one preferred embodiment of the invention the vehicle door comprises a windowsill and the gas bag is supported along the majority of the windowsill, this large supporting surface area of the gas bag on the windowsill ensuring enhanced stability. It is good practice when the gas bag is fabricated to extend far up to the front side of the door to prevent the hands of the vehicle occupant from being catapulted outwards from the vehicle. For this purpose the gas bag is shaped so that particularly the forward window area is covered practically completely, thus also enabling the gas bag to gain maximum possible stability from being supported at the A-pillar and windowsill. Preferably the gas bag extends likewise up to the vehicle rear end of the windowsill to also provide head protection for the vehicle occupant.

In a further preferred embodiment of the invention the gas bag comprises two chambers, the first, outer chamber of which is configured tubular and has a high internal overpressure and the second, inner chamber is cushion-shaped and has a lower internal overpressure, the first, outer chamber surrounding the second, inner chamber. The outer chamber forms a stable frame due to its high internal overpressure endowing the gas bag with the necessary stability and by which the gas bag is supported at the A-pillar and at the windowsill. The inner chamber is configured as a cushion having a lower internal overpressure so that a vehicle occupant catapulted into the gas bag does not rebound therefrom but is softly cushioned therein. It is in this way that the necessary stability can be combined with the necessary pliancy of the gas bag. Preferably, the outer chamber and the inner chamber are not in flow connection with each other. Thus, the frame formed by the outer chamber retains its stability during the entire time the gas bag is inflated.

In the folded condition the gas bag can be accommodated in the windowsill or in the A-pillar.

BRIEF DESCRIPTION OF THE DRAWINGS

FIG. 1a is a side view of a first embodiment of the invention,

FIG. 1b is a front view of the assembly as shown in FIG. 1a,

FIG. 2a is a side view of a second embodiment of the invention, and

FIG. 2b is a front view of the assembly as shown in FIG. 2a.

DETAILED DESCRIPTION OF PREFERRED EMBODIMENTS

Referring now to FIGS. 1a and 1b there is illustrated the assembly in accordance with the invention comprising a vehicle door 10, the portion of the A-pillar 12 of a vehicle and a gas bag 14. The vehicle door 10 incorporates a windowsill 16.

Prior to deployment the gas bag 14 is preferably accommodated in the vehicle door 10. When the vehicle is involved in an accident, for example, in head-on collision with an obstacle, the gas bag 14 is activated by a sensor (not shown) and inflated by compressed gas from an inflator (not shown). The gas bag 14 is shown in this inflated condition in all Figures.

The gas bag 14 itself is made of a gas-tight material and comprises no gas-exit ports or vents. The seal of the gas bag 14 is fabricated so that it maintains a high internal overpressure over a longish period of time (approx. 5 seconds), the internal overpressure being preferably in excess of $10^5$ Pa (14.5 psi).

The gas bag 14 extends along the windowsill 16 so that the majority of the side window 18 is covered by the gas bag 14. More particularly the gas bag 14 extends up to the front side of the side window 18 in the direction of the forward end of the vehicle to permit cushioning the hands and lowers arms of a vehicle occupant in preventing them from being catapulted outwards from the vehicle. The gas bag 14 likewise utilizes a further section of the A-pillar 12 or corresponding section of the door frame for support, thus resulting in two surface area supports 20, 22 for the gas bag 14 endowing it with stability.

It may be provided for that the gas bag is shaped for being supported by the windowsill 16 so that it comprises in the inflated condition a rim 24 resting on the windowsill 16. This rim or kink 24 in the contour of the gas bag 14 prevents the gas bag 14 from being displaced downwards.

Due to the high internal overpressure and the support as may be provided the free end 26 of the gas bag 14 not supported by the A-pillar 12 or windowsill 16 also comprises a sufficiently high stability to prevent the head of the vehicle occupant from being catapulted outwards from the vehicle.

Referring now to FIGS. 2a and 2b there is illustrated a further advantageous embodiment of the invention whereby like parts already described relative to the first embodiment are identified by like reference numerals. The arrangement and size of the gas bag 114 in accordance with this second embodiment are similar to those in the first embodiment. The gas bag 114 in accordance with the second embodiment consisting of two chambers 116, 118, the first, outer chamber 116 being configured tubular and forming a frame (indicated by circle marks) surrounding the second, cushion-shaped inner chamber 118 (indicated by cross marks).

The internal pressure in the one chamber 116 differs from that of the other chamber 118, the outer chamber 116 having a high internal overpressure exceeding 1 bar so that this chamber 116 comprises sufficient stability to serve as a stable frame. The same as in the first embodiment this frame is supported in both the region of the A-pillar 12 and at the windowsill 16, whereas the second, inner chamber 118 has a significantly lower internal overpressure to prevent the vehicle occupant cushioned by the gas bag from rebounding therefrom. The outer chamber 116 and the inner chamber 118 are not in flow connection with each other. The shape of the transition between the two chambers 116, 118 may be made use of to form the rim or kink 24 by which the gas bag 114 is supported at the windowsill 16.

It is also conceivable that the inner chamber 118 is further subdivided.

What is claimed is:

1. An assembly consisting of:
   a vehicle door,
   an A-pillar of a vehicle, and
   an inflatable gas bag located in said vehicle door,
   said gas bag being supported by said vehicle door and in the region of said A-pillar of said vehicle in an inflated condition of said gas bag, and
   said gas bag having an internal overpressure in said inflated state, said internal overpressure exceeding $10^5$ Pa (14.5 psi) in at least one part of said inflated gas bag.

2. The assembly as set forth in claim 1 wherein said gas bag is gas tight.

3. The assembly as set forth in claim 1 wherein said vehicle door comprises a windowsill, said gas bag being supported along a majority of said windowsill.

4. An assembly consisting of:
   a vehicle door,
   an A-pillar of a vehicle, and
   an inflatable gas bag,
   said gas bag being supported by said vehicle door and in the region of said A-pillar of said vehicle in an inflated condition of said gas bag,
   said gas bag having an internal overpressure in said inflated state, said internal overpressure exceeding $10^5$ Pa (14.5 psi) in at least one part of said inflated gas bag,
   said gas bag comprising two chambers, a first of said chambers forming an outer chamber and being configured tubular and having a high internal overpressure, and a second of said chamber forming an inner chamber and being cushion-shaped and having a lower internal overpressure, said first chamber surrounding said second chamber.

5. The assembly as set forth in claim 4 wherein said first chamber and said second chamber are not in flow connection with each other.

6. An assembly for helping to protect an occupant of a vehicle without a roof contour upon the occurrence of a vehicle crash event, the assembly comprising:
   a vehicle door including a window and a windowsill,
   an A-pillar of a vehicle, and
   an inflatable gas bag located in the vehicle door,
   the A-pillar engaging and supporting at least a portion of the gas bag when inflated to stabilize the position of the inflated gas bag,
   the gas bag, when inflated, having a rim extending along the windowsill, the windowsill engaging and supporting the rim of the gas bag to further stabilize the position of the inflated gas bag,
   the gas bag having an internal overpressure when inflated, the internal overpressure exceeding $10^5$ Pa (14.5 psi) in at least one portion of the inflated gas bag.

* * * * *